(12) United States Patent  
Hosogoe

(10) Patent No.: US 6,483,422 B2
(45) Date of Patent: Nov. 19, 2002

(54) ROTARY SENSOR CAPABLE OF ACCURATELY DETECTING ANGLE OF ROTATION TO BE TRANSMITTED FROM THE OUTSIDE

(75) Inventor: Junichi Hosogoe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/907,126

(22) Filed: Jul. 16, 2001

(65) Prior Publication Data

US 2002/0056323 A1 May 16, 2002

(30) Foreign Application Priority Data

Jul. 25, 2000 (JP) .......................................... 2000-229018

(51) Int. Cl.⁷ .............................................. H01C 10/32
(52) U.S. Cl. ........................ 338/162; 338/163; 338/167
(58) Field of Search ................................. 338/162, 163, 338/167, 184, 190

(56) References Cited

U.S. PATENT DOCUMENTS

| 3,197,726 | A | * | 7/1965  | Hulbert ..................... 338/162 |
| 3,286,521 | A |   | 11/1966 | Stout, Jr. |
| 3,377,605 | A | * | 4/1968  | Baskett ...................... 338/162 |
| 3,377,606 | A | * | 4/1968  | Ferrell ....................... 338/162 |
| 3,456,227 | A | * | 7/1969  | Paine et al. ................. 338/162 |
| 4,110,722 | A | * | 8/1978  | Brendle et al. ............. 338/174 |
| 4,114,132 | A | * | 9/1978  | DeRouen et al. ........... 338/174 |
| 4,565,990 | A | * | 1/1986  | Matsui et al. ............... 338/171 |
| 5,567,874 | A |   | 10/1996 | Suzuki et al. |
| 5,571,960 | A |   | 11/1996 | Tateishi et al. |

FOREIGN PATENT DOCUMENTS

| DE | 1490258    | * 10/1964 | ................. 338/162 |
| EP | 1014040 A1 |   6/2000  |                          |
| JP | 2000-88510 |   3/2000  |                          |

* cited by examiner

Primary Examiner—Karl D. Easthom
(74) Attorney, Agent, or Firm—Beyer Weaver & Thomas

(57) ABSTRACT

The rotor 2 has an engaging portion 2b and a shaft portion 2c provided at the rotation-central portion of the rotor, a casing 7 has a supporting portion 8 provided at a position opposite to a shaft portion, the shaft portion is formed with a recess 2d, the supporting portion is formed with a conical portion 8c, a conical portion is disposed within the recess, the shaft portion is supported by a conical portion fitted in the recess, and the conical portion is used as a fulcrum, whereby it is made difficult to generate large shavings.

5 Claims, 10 Drawing Sheets

ROTARY SENSOR CAPABLE OF ACCURATELY DETECTING ANGLE OF ROTATION TO BE TRANSMITTED FROM THE OUTSIDE

BACKGROUND OF THE INVENTION

1. Field of the Invention

The present invention relates to a rotary sensor, and more particularly to a rotary sensor capable of accurately detecting an angle of rotation to be transmitted from the outside.

2. Description of the Related Art

With reference to the drawings, the description will be made of a conventional rotary sensor. FIG. 18 is an essential sectional view showing a conventional rotary sensor under application by Japanese Patent Laid-Open Application No. 2000-88510 and U.S. patent application Ser. No. 09/390463 corresponding thereto.

As shown in FIG. 18, the conventional rotary sensor has a casing 30 being, for example, box-shaped (not shown) in external shape, made of synthetic resin material or the like, and this casing 30 has a base portion covered with a bottom wall 31. Part of the bottom wall 31 is caused to project on the right side in the figure to thereby form a substantially cylindrical storage portion 32, and this storage portion 32 is formed by a surrounding side wall 33 and a base plate 34 at the base portion.

At the substantially central portion of the base plate 34, there is formed a supporting portion 34a for projecting in the left direction in the figure on the storage portion 32 side, and at the center of this supporting portion 34a, there is formed a semi-spherical bearing portion 34b including a recess.

Near a side wall 33 within the storage portion 32 on the base plate 34, there is projectingly formed a substrate holding portion 34c for mounting a resistor substrate 37 to be described later.

Within the storage portion 32, a substantially disk-shaped rotor 35 made of synthetic resin material is rotatably housed. This rotor 35 has an engaging portion 35a and a shaft portion 35b which are projectingly formed on one side above the rotor 35 as shown and on the other side below at a center of rotation with a center line A as the center of rotation respectively in such a manner that this shaft portion 35b is supported by a supporting portion 34a formed at the base plate 34.

The engaging portion 35a has two engaging walls 35c and 35c which are projectingly formed with the center line A being interposed therebetween, and between these two engaging walls 35c and 35c, there is formed a groove portion 35d having a predetermined width extending in a direction perpendicular to the center line A.

The respective tip end portions of the engaging walls 35c and 35c have substantially semi-circular protruded portions 35e and 35e formed projectingly on the groove portion 35d side respectively.

Also, the shaft portion 35b of the rotor 35 has a tip end portion projectingly formed in a substantially semi-spherical shape, and this shaft portion 35b is rotatably supported by a bearing portion 34b of the base plate 34, and is adapted not to move in a direction perpendicular to the center line A.

On the side of the rotor 35 on the side on which the shaft portion 35b has been formed, there is mounted a moving contact piece 36a with a spring operation, which is a part of a component constituting an angle detecting member 36.

This moving contact piece 36a is formed with a contact portion (not shown) which slides in contact with a resistor pattern and a collector pattern (not shown) to be described later.

On the opposite side to a surface to which the moving contact piece 36a is mounted, there is disposed a resistor substrate 37 with a predetermined clearance spaced, and this resistor substrate 37 is positioned at a substrate holding portion 34c of the base plate 34 to be fixed by means of caulking or the like.

The surface of the resistor substrate 37 is formed with the resistor pattern and the collector pattern (not shown) by means of printing or the like, and the moving contact piece 36a is adapted to come into elastic contact with the resistor pattern and the collector pattern (not shown).

Also, the resistor substrate 37 is formed with a through-hole 37a at its substantially central portion, and in this through-hole 37a, the supporting portion 34a of the base plate 34 is inserted, and the tip end of the supporting portion 34a is projectingly disposed on the side of a surface on which the resistor pattern and the collector pattern (not shown) are provided.

In this respect, the angle detecting member 36 is constituted by the moving contact piece 36a, and the resistor substrate 37 having the resistor pattern and the collector pattern (not shown).

Below the resistor substrate 37, a plurality of substantially L-character-shaped terminals 38 are connected correspondingly to the resistor pattern and the collector pattern (not shown), and this terminal 38 is drawn out of the end surface of the resistor substrate 37, and is connected to the tip end portion 38a drawn out on the left side in a state abutted against the inner surface of the side wall 33, to a lead pattern (not shown) on a FPC39 by means of soldering or the like.

Above the rotor 35, there is disposed an upper plate 40 for closing the storage portion 32 as a cover, and this upper plate 40 is mounted to mounting protrusions 31a formed at plural places on the bottom wall 31 and is fixed thereto by means of thermal caulking or the like.

At the central portion of the upper plate 40, there is formed an aperture 40a in which the engaging portion 35a of the rotor 35 is located, and around this aperture 40a, there is formed a supporting wall 40b, which is projectingly formed in a cylindrical shape on the internal rotor 35 side. Thus, the rotor 35 is adapted not to incline more than a predetermined value by means of the supporting wall 40b.

Between the upper plate 40 and the rotor 35, there is formed a clearance portion 41, and in this clearance portion 41, there is disposed an elastic member 42. This elastic member 42 is made of plate material annular in external shape with a spring operation such as a phosphor bronze plate, and flat mounting portions (not shown) are formed at plural places constituting a ring shape.

Also, in the elastic member 42, by curving a part of its annular portion in a wave-shape, elastically-contacted portions (not shown) are formed at plural places, and this elastic member 42 is caulked to a protrusion (not shown) formed on the rotor 35 side. The spring pressure of the elastic member 42 is set to be greater than that of the moving contact piece 36a.

Thus, the elastically-contacted portions (not shown) always come into elastic contact with the rotor 35 at plural places of the elastic member 42, whereby the rotor 35 is pressed against the base plate 34 side, the shaft portion 35b is supported by the bearing portion 34b of the supporting portion 34a, and rotation of a driving shaft 43 to be described later is transmitted so that the rotor 35 is rotatably supported within the storage portion 32.

Also, the rotor 35 is supported with the supporting portion 34a as a fulcrum in such a manner that the engaging portion 35a can move obliquely and return in any direction perpendicular to the center line A, which is the center of rotation, by the operation of the elastic member 42.

In order to detect an angle of rotation of a throttle valve for, for example, an automobile or the like through the use of a rotary sensor having the above-described structure, the casing 30 is first mounted to the main body of a throttle body (not shown). Then, as shown in FIG. 18, a driving shaft 43 coupled to the rotating shaft (not shown) or the like of the throttle valve is inserted into the groove portion 35d of the engaging portion 35a of the rotor 35 for being positioned.

This driving shaft 43 is formed in a circular rod shape, and at its tip end portion, there is formed a flat plate-shaped protruded portion 43a passing through the center line A, which is the center of rotation. The driving shaft 43 is adapted to reciprocatively rotate within a predetermined range of angle of rotation.

Thus, the protruded portion 43a is inserted into the groove portion 35d of the rotor 35, and the driving shaft 43 engages the engaging portion 35a so that the rotor 35 rotates following the rotation of the driving shaft 43. In this respect, when the protruded portion 43a is inserted into the groove portion 35d in an off-center state at that time, the rotor 35 obliquely moves to thereby couple the two.

In the conventional rotary sensor, however, the supporting portion 34a of the base plate 34 is inserted through the through-hole 37a of the resistor substrate 37, and the tip end of the supporting portion 34a is projectingly disposed on the side of the surface, on which the resistor pattern and the collector pattern (not shown) have been provided. In this state, the shaft portion 35b of the rotor 35, which has been projectingly formed in a substantially semi-spherical shape, is rotatably supported by the bearing portion 34b provided at the supporting portion 34a. In this state, the rotation of the rotor 35 causes the shaft portion 35b and the bearing portion 34b to chafe against each other.

This chafing may generate shavings. Since the bearing portion 34b is a recess and does not move, but is further coated with grease, the shavings temporarily accumulate in a small clearance between the bearing portion 34b and the shaft portion 35b or its periphery, and further are kneaded with grease to become comparatively large.

Thus, when the rotation of the rotor 35 is stopped and it is rotated again, these temporarily accumulated shavings or comparatively large shavings may adhere onto the side of the surface of the resistor substrate 37, on which the resistor pattern and the collector pattern (not shown) have been provided.

When these temporarily accumulated shavings or comparatively large shavings adhere onto the side of the surface of the resistor substrate 37 and the collector pattern as described above, there arises a problem that the electric characteristics and service life of the rotary sensor will be adversely affected.

SUMMARY OF THE INVENTION

A rotary sensor according to the present invention solves the above-described problems, and its object is to provide a rotary sensor having a long service life, capable of maintaining the stable electric characteristics.

A rotary sensor according to the present invention comprises: a rotor having an engaging portion, with which the driving shaft engages; a casing for rotatably supporting the rotor; and an angle detecting member housed within this casing, for being operated by the rotation of the rotor, wherein the rotor has an engaging portion located forward; and a shaft portion located at the rear on the opposite side, provided at the rotor-central portion of the rotor, the casing has a supporting portion provided at a position opposite to the shaft portion of the rotor, there is formed a recess at the shaft portion of the rotor, there is formed a convex-shaped conical portion in the supporting portion of the casing, and there is disposed a conical portion within the recess, and the shaft portion is supported by the conical portion fitted in the recess.

In the rotary sensor according to the present invention, the angle detecting member has a resistor pattern or an electric conductor pattern constituting a portion thereof, and the resistor pattern or the electric conductor pattern is provided on one surface on a flat plate-shaped proximal portion having a through-hole, and the tip end portion of the shaft portion is inserted through the through-hole beyond one surface of the proximal portion.

Also, in the rotary sensor according to the present invention, the casing has a bottom wall provided with the supporting portion, and between the bottom wall and the proximal portion, there is provided a clearance portion.

Also, in the rotary sensor according to the present invention, the supporting portion is formed of metallic material separated from the casing, and the supporting portion is held by the casing.

Also, in the rotary sensor according to the present invention, at the tip end of the shaft portion, there is provided a cylindrical portion, the recess is constituted by a circular hole located at the cylindrical portion and a conical recess formed within this circular hole, the protruded portion has a conical portion provided on the tip end side and a circular column portion on the base side, contiguously provided to the conical portion and the circular column portion is fitted into the cylindrical portion in such a manner that the cylindrical portion is guided by the outer peripheral surface of the circular column portion and the rotor is pivotally supported by the supporting portion.

DESCRIPTION OF THE PREFERRED EMBODIMENTS

Hereinafter, with reference to the drawings, the description will be made of the rotary sensor according to the present invention.

Figure 1:
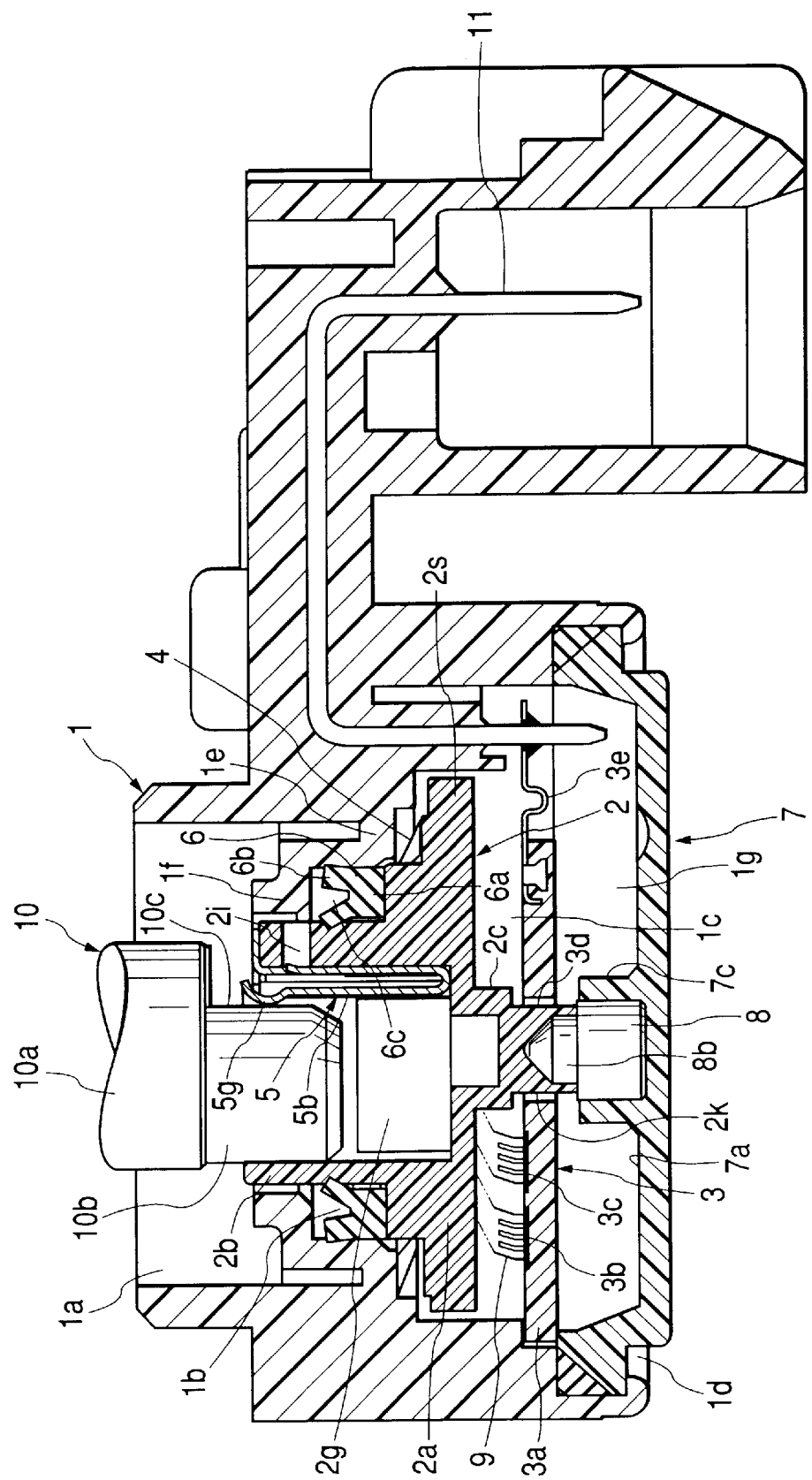
FIG. 1 is an essential sectional view showing a rotary sensor according to an embodiment of the present invention.
Figure 2:
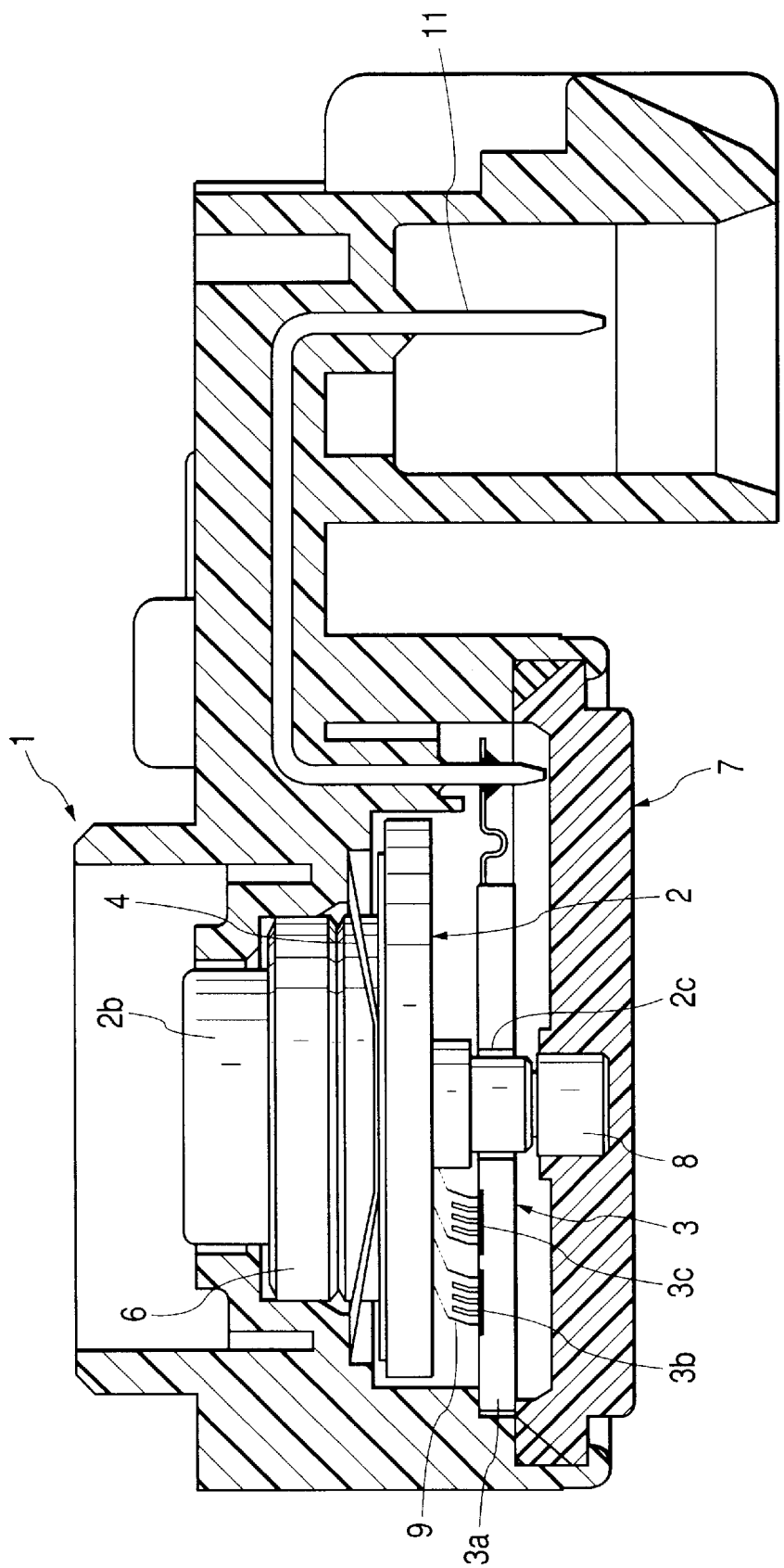
FIG. 2 is an essential sectional view for explaining the rotary sensor according to the embodiment of the present invention.
Figure 3:
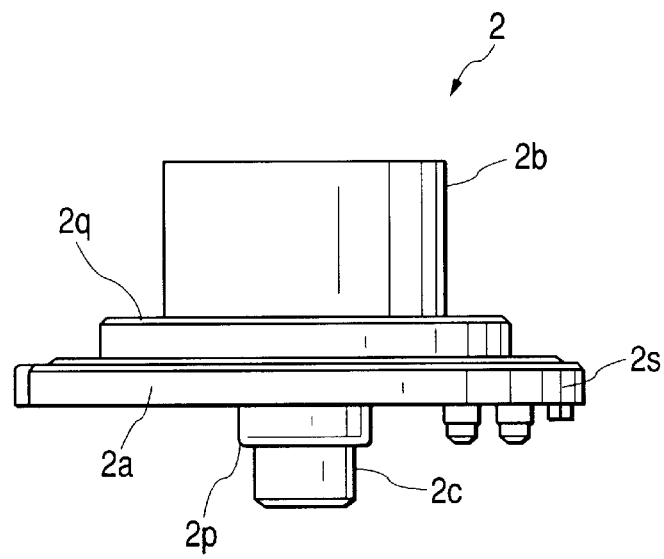
FIG. 3 is a front view showing a rotor for the rotary sensor according to the embodiment of the present invention.
Figure 4:
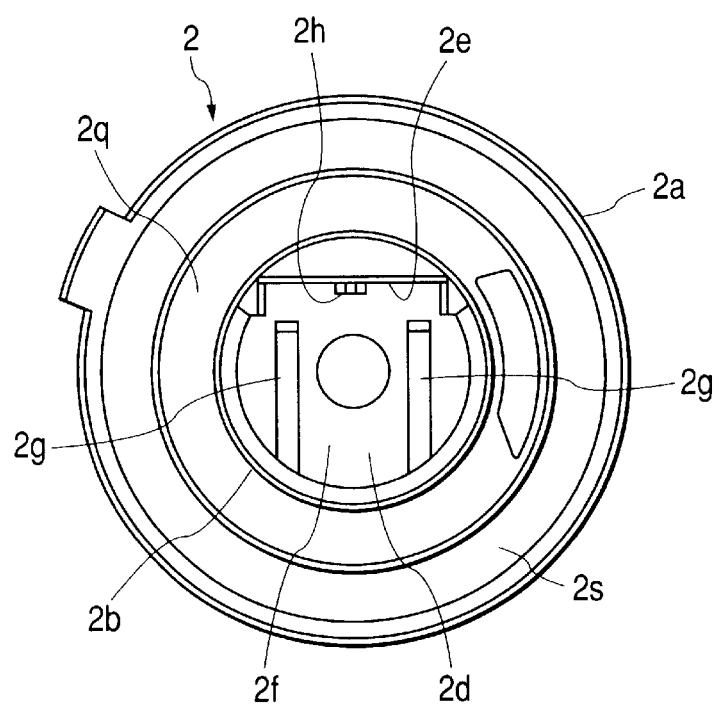
FIG. 4 is a plan view of FIG. 3.
Figure 5:
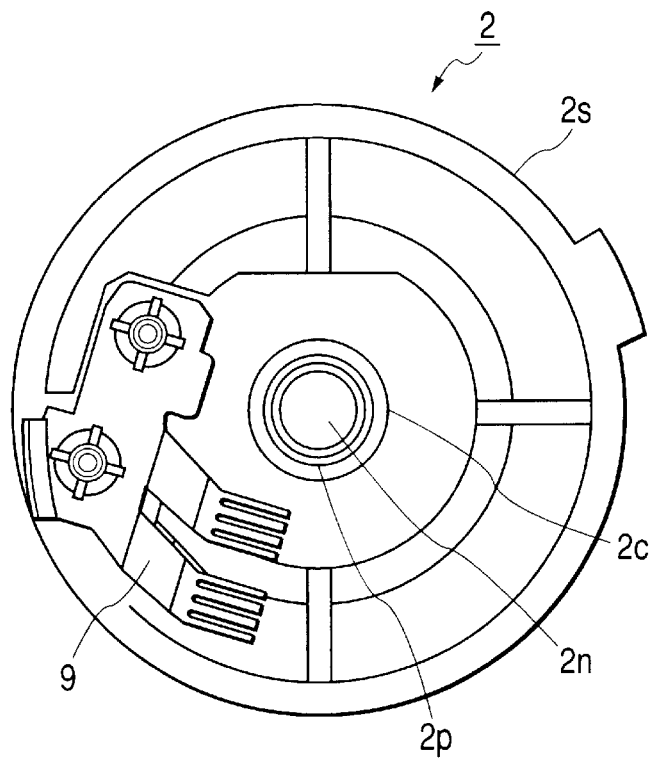
FIG. 5 is a bottom view showing the rotor and a moving contact for the rotary sensor according to the embodiment of the present invention.
Figure 6:
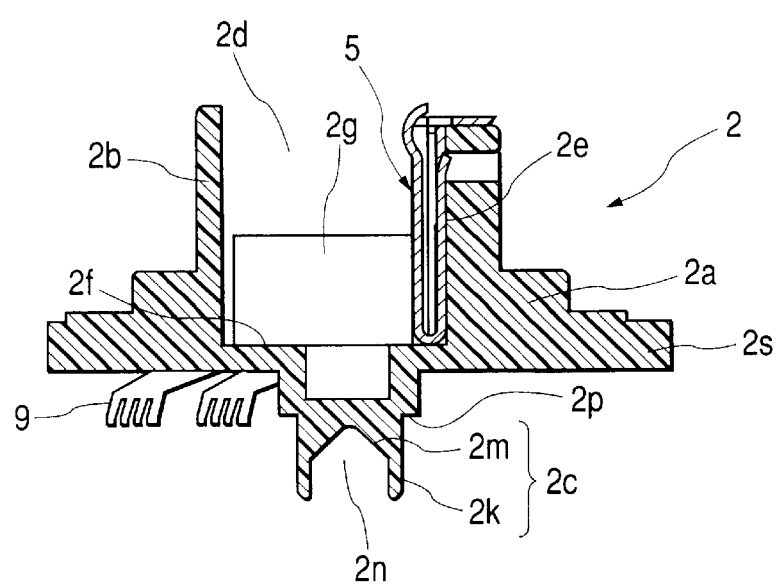
FIG. 6 is a bottom view showing the rotor, the moving contact and a first elastic member for the rotary sensor according to the embodiment of the present invention.
Figure 7:
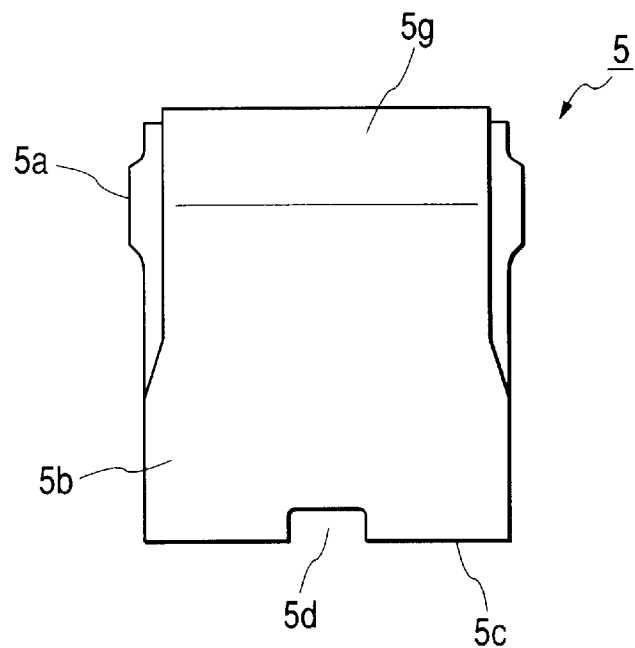
FIG. 7 is a front view showing the first elastic member for the rotary sensor according to the embodiment of the present invention.
Figure 8:
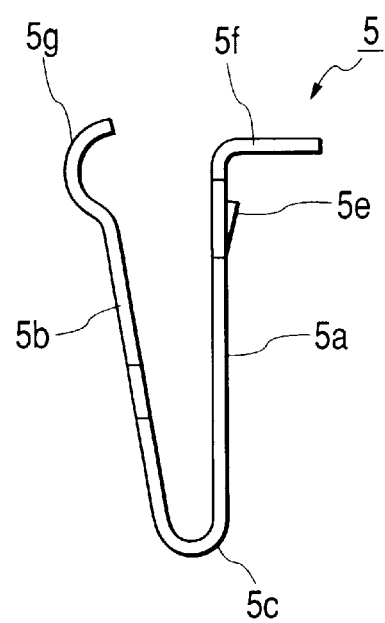
FIG. 8 is a side view of FIG. 7.
Figure 9:
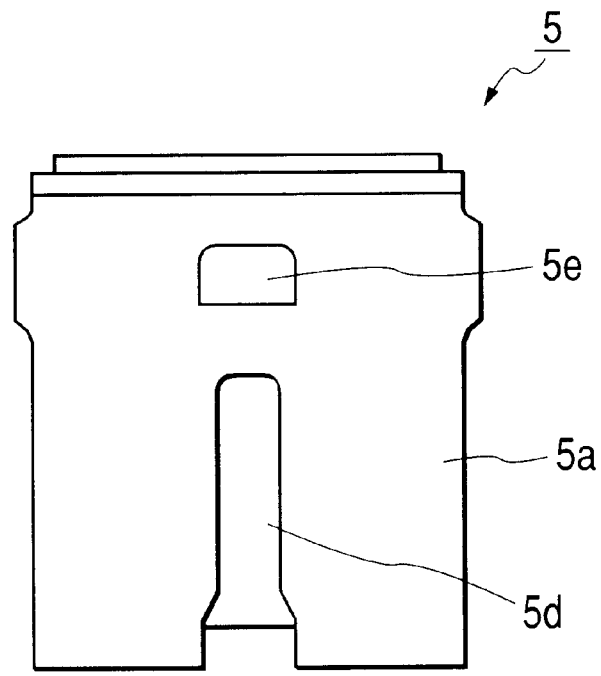
FIG. 9 is a rear view of FIG. 7.
Figure 10:
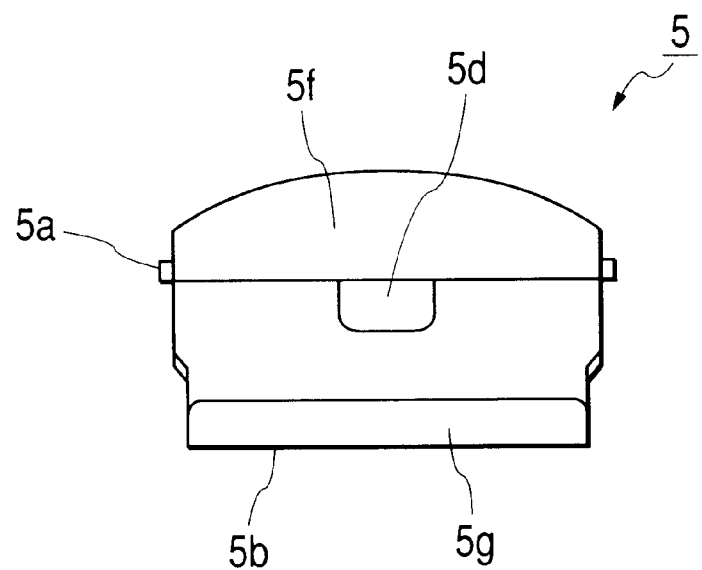
FIG. 10 is a plan view of FIG. 7.
Figure 11:
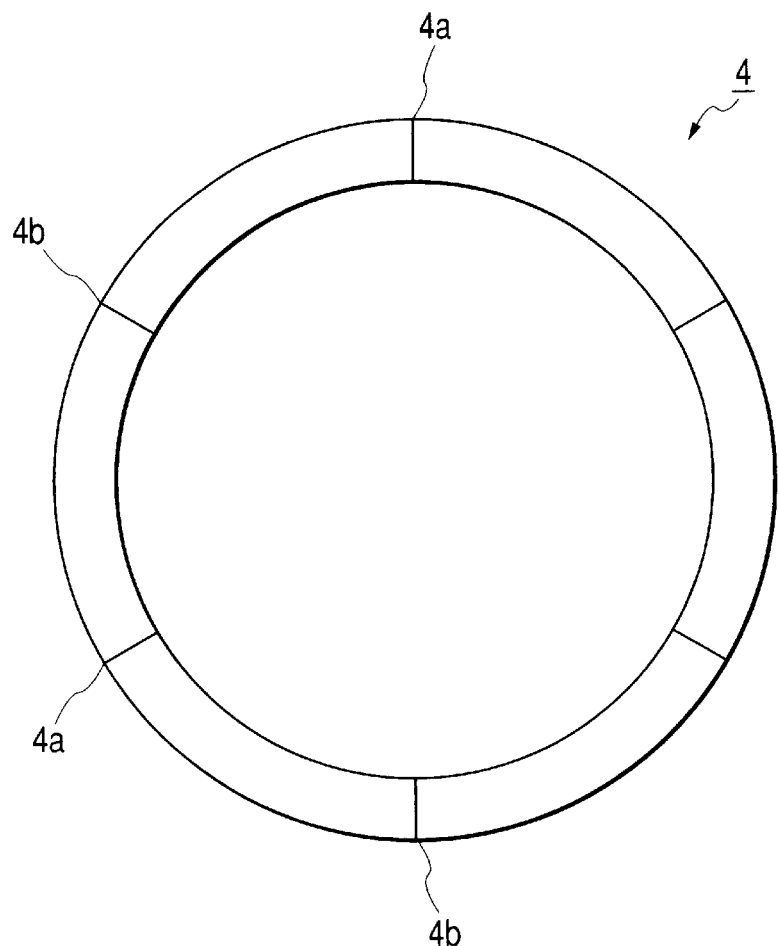
FIG. 11 is a plan view showing a second elastic member for the rotary sensor according to the embodiment of the present invention.
Figure 12:
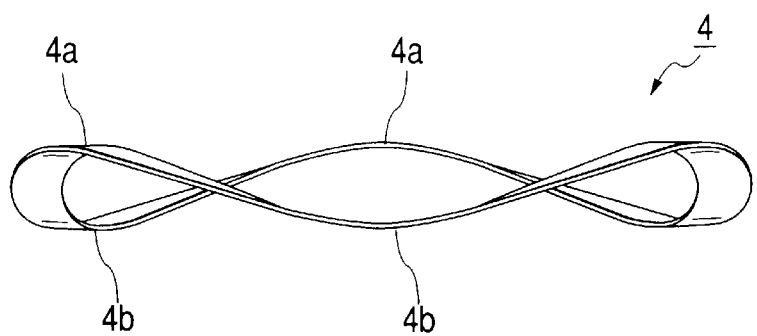
FIG. 12 is a side view of FIG. 11.
Figure 13:
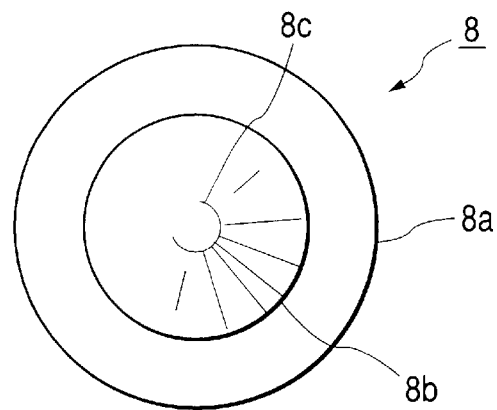
FIG. 13 is a plan view showing a supporting portion for the rotary sensor according to the embodiment of the present invention.
Figure 14:
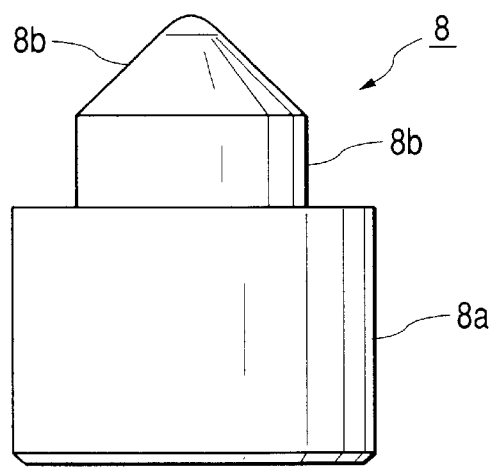
FIG. 14 is a front view of FIG. 13.
Figure 15:
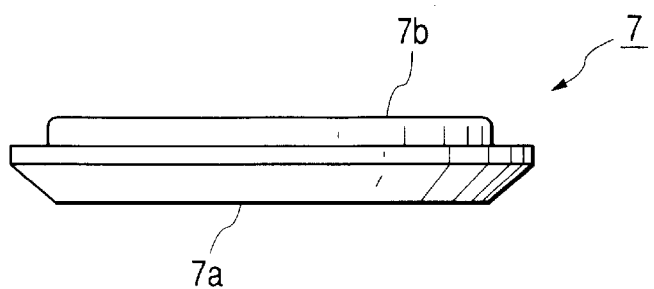
FIG. 15 is a front view showing a cover member for the rotary sensor according to the embodiment of the present invention.
Figure 16:
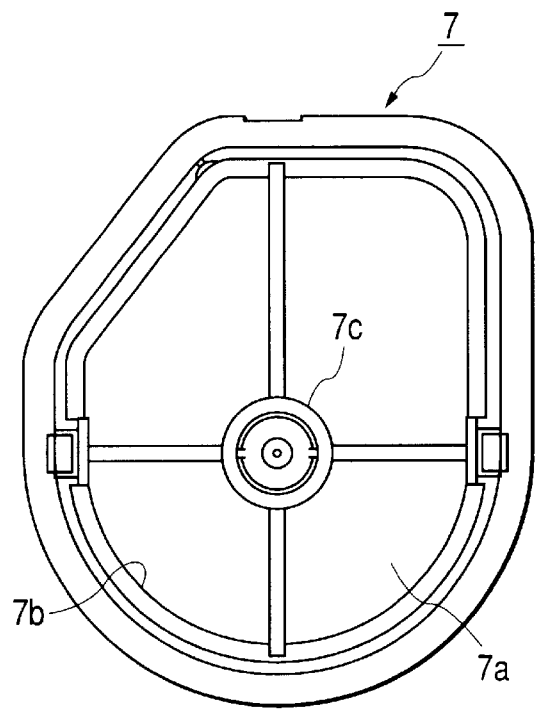
FIG. 16 is a plan view of FIG. 15.
Figure 17:
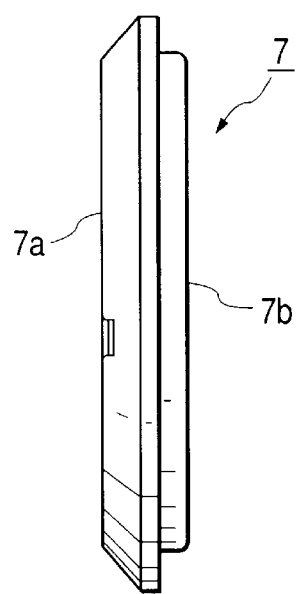
FIG. 17 is a side view of FIG. 16.
Figure 18:
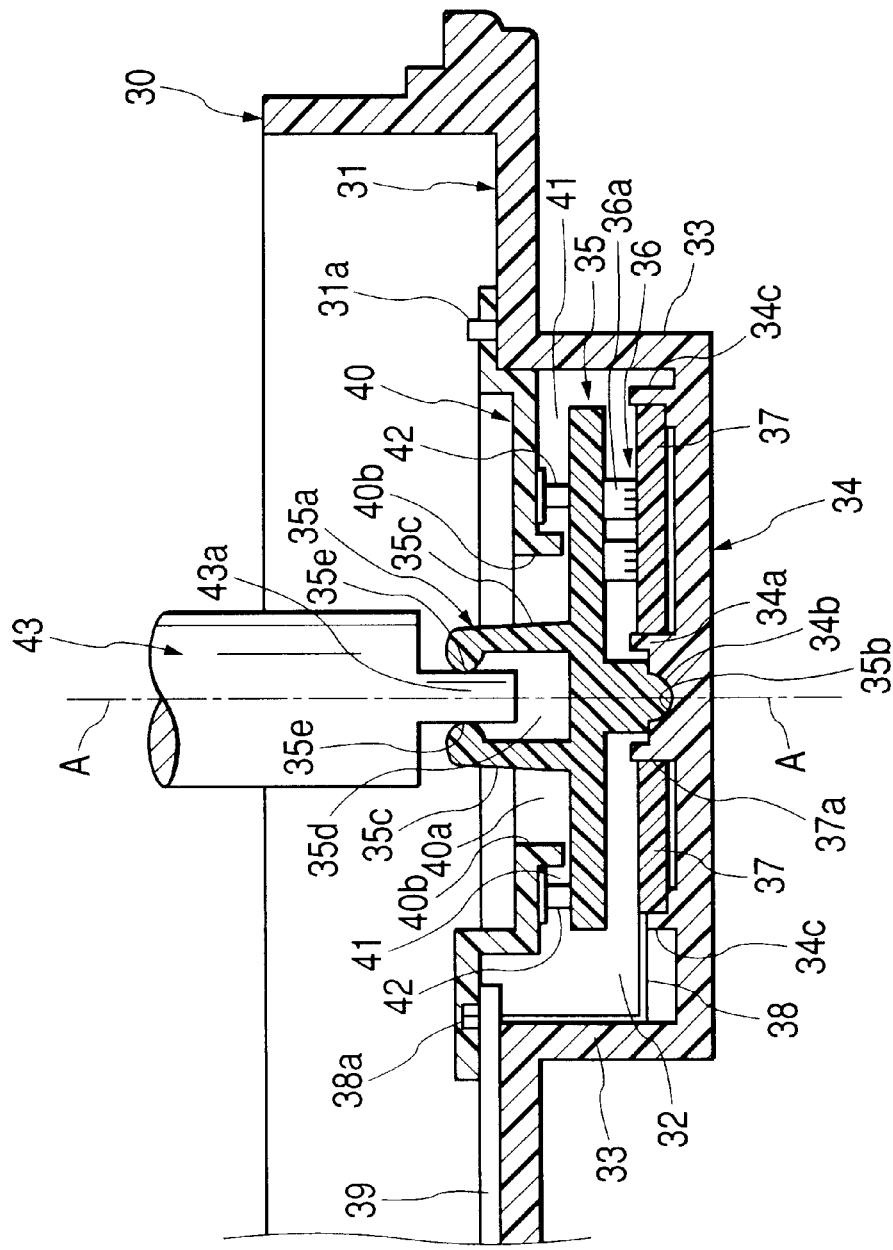
FIG. 18 is an essential sectional view showing a conventional rotary sensor.

FIG. 1 is a sectional view showing a rotary sensor according to an embodiment of the present invention; FIG. 2 is an essential sectional view for explaining the rotary sensor according to the embodiment of the present invention; FIG. 3 is a front view showing a rotor for the rotary sensor according to the embodiment of the present invention; FIG. 4 is a plan view of FIG. 3; FIG. 5 is a bottom view showing the rotor and a moving contact for the rotary sensor according to the embodiment of the present invention; FIG. 6 is a sectional view showing the rotor, the moving contact and a first elastic member for the rotary sensor according to the embodiment of the present invention; FIG. 7 is a front view showing the first elastic member for the rotary sensor according to the embodiment of the present invention; FIG. 8 is a side view of FIG. 7; FIG. 9 is a rear view of FIG. 7; FIG. 10 is a plan view of FIG. 7; FIG. 11 is a plan view showing a second elastic member for the rotary sensor according to the embodiment of the present invention; FIG. 12 is a side view of FIG. 11; FIG. 13 is a plan view showing a supporting portion for the rotary sensor according to the embodiment of the present invention; FIG. 14 is a front view of FIG. 13; FIG. 15 is a front view showing a cover member for the rotary sensor according to the embodiment of the present invention; FIG. 16 is a plan view of FIG. 15; and FIG. 17 is a side view of FIG. 16.

As shown in these figures, the rotary sensor according to the present invention is mainly constituted by: a rotor 2 having an engaging portion 2b, with which a driving shaft such as a slot shaft for a vehicle engages; a casing consisting of a casing 1 for rotatably holding the rotor 2 and a cover body 7 for closing an aperture of the casing 1 as a cover; and an angle detecting member consisting of a moving contact 9, a resistor pattern 3b and a collector pattern 3c, housed within the casing for being operated by the rotation of the rotor 2.

As shown in FIGS. 1 to 17, the casing 1 is made of synthetic resin material such as, for example, polyphenylene sulfide (PPS), is formed by means of fabrication, and the casing 1 has, at its end surface, a large-diameter hole portion 1a, a small-diameter hole portion 1b and a storage portion 1c contiguously provided to the small-diameter hole portion 1b. Also, below the storage portion 1c, that is, on the other end surface of the casing 1, there is formed an open end portion 1d, and the casing 1 is constructed such that both end portions are opened: one end surface is opened by the small-diameter hole portion 1b and the other end surface is opened by the open end portion 1d.

Also, the small-diameter hole portion 1b is formed by through-holes provided at an annular first stepped portion 1e provided to a first diameter dimension and at an annular second stepped portion 1f provided to a second diameter dimension smaller than the first diameter dimension. These first stepped portion 1e and second stepped portion 1f are formed as a so-called supporting portion.

The rotor 2 is made of synthetic resin material such as, for example, polybutylene terephthalate (PBT), is formed by means of fabrication, and has a substantially disk-shaped proximal portion 2a, an engaging portion 2b located and provided in front of the proximal portion 2a, and a shaft portion 2c located at the rear on the opposite side, and provided at the rotation center portion of the rotor 2. These engaging portion 2b and shaft portion 2c are projectingly provided outwardly from the proximal portion 2a respectively. Also, at the outer peripheral edge portion of the proximal portion 2a, there is formed a so-called collar portion 2s.

In this respect, the outer peripheral diameter of the engaging portion 2b is made slightly smaller than the diameter of the small-diameter hole portion 1e so that there is secured space to allow the rotator to incline.

Also, the engaging portion 2b is provided, at the substantially central portion, with a recess 2d having a substantially D-character-shaped cross-section; a flat surface portion 2e provided at a portion within the recess 2d, parallel to the direction of the axial center of the rotor 2; and a pair of protruded portions 2g projecting from the bottom wall 2f of the recess 2d in an inward direction thereof. This pair of protruded portions 2g are formed to a height dimension about one half of the depth dimension of the recess 2d, and the protruded portion 2g is provided such that its side is opposite to a part of the flat surface portion 2e.

The flat surface portion 2e is provided with a ridge portion 2h parallel to the direction of axis of a driving shaft 10 to be described later, and a through-hole 2i as a recess above the ridge portion 2h.

Also, on the outer periphery of the engaging portion 2b, there is formed an annular stepped portion 2q.

The shaft portion 2c is substantially column- shaped in external shape, and the shaft portion 2c is provided with a cylindrical portion 2k, which is substantially cylindrical, on the tip end side, and a conical portion 2m, which is substantially conical, on the side of the base of the cylindrical portion 2k. This cylindrical portion 2k and the conical portion 2m constitute a recess 2n.

Also, on the outer periphery of the shaft portion 2c, there is provided an annular stepped portion 2p.

The driving shaft 10 to be described later is engaged with the engaging portion 2b. The driving shaft 10 is adapted to reciprocatively rotate within a predetermined range of angle of rotation.

The tip end of the engaging portion 2b of the rotor 2 is inserted into the small-diameter hole portion 1b of the casing 1, and the proximal portion 2a of the rotor 2 is housed within the storage portion 1c of the casing 1.

In this state, a first stepped portion 2q having a large diameter of the rotor 2 and a first stepped portion 1e of the casing 1 are disposed opposite to each other, and a second stepped portion 2r having a small diameter of the rotor 2 and a second stepped portion 1f of the casing 1 are disposed opposite to each other.

Also, at the underside (shaft portion 2c side) of the proximal portion 2a of the rotor 2, a moving contact 9 made of metallic material, formed by means of the press working is fixed by appropriate means such as thermal caulking. This moving contact 9 is a part of a member constituting the angle detecting member.

A resistor substrate 3 is made of, for example, synthetic resin material, and has a flat plate-shaped proximal portion 3*a*; a resistor pattern 3*b* and an electric conductor pattern 3*c* which have been provided by means of, for example, printing, on one surface of the proximal portion 3*a*; a through-hole 3*d* provided in the proximal portion 3*a*; and a plurality of (for example, three) terminals 3*e*, disposed on the right side of the proximal portion 3*a*, electrically connected to the resistor pattern 3*b* and the electric conductor pattern 3*c*. These resistor pattern 3*b* and electric conductor pattern 3*c* are a part of a member constituting the angle detecting member respectively.

This resistor substrate 3 is disposed within the storage portion 1*c* of the casing 1 by appropriate means, and at this time, the tip end portion of the shaft portion 2*c* of the rotor 2 is fitted into the through-hole 3*d* of the proximal portion 3*a* of the resistor substrate 3 beyond one surface (surface) of the proximal portion 3*a*.

Also, on the resistor pattern 3*b* and the electric conductor pattern 3*c* of the resistor substrate 3, there is disposed the moving contact 9 so as to be able to slidably contact.

The terminal 3*e* of the resistor substrate 3 is soldered to respective lead-through terminals 11 integrally formed within the casing 1, and the terminal 3*e* and the lead-through terminals 11 are electrically connected.

The first elastic member 5 is, as shown in FIGS. 7 to 10, made of flat plate-shaped metallic material such as, for example, stainless steel, is formed by means of press working, and has a flat portion 5*a*, which is substantially flat, a spring portion 5*b*, which is opposite to the flat portion 5*a*, and a bent portion 5*c*, the cross section of which is bent in a U-character shape, for coupling the flat portion 5*a* to the spring portion 5*b*.

Also, the flat portion 5*a* has a kerf 5*d* at its central portion and a raised-up portion 5*e*, which has been raised up outwardly in the vicinity of one end portion of the kerf 5*d*. Also, on the free end side of the flat portion 5*a*, there is disposed a substantially circular arc-shaped holding portion 5*f* extendedly provided in a direction substantially perpendicular to the flat portion 5*a*.

The spring portion 5*b* is formed with a substantially circular arc-shaped elastically-contacted portion 5*g* projectingly provided outwardly at its free end.

This first elastic member 5 is constituted as a so-called plate spring.

The first elastic member 5 is formed so as to have a predetermined spring pressure such as, for example, about 600 g as the spring pressure f1.

This first elastic member 5 is disposed in a clearance between the flat surface portion 2*e* and the pair of protruded portions 2*g* in such a manner that the bent portion 5*c* abuts against the bottom wall 2*f* of the recess 2*d* of the rotor 2. In this state, the flat portion 5*a* of the first elastic member 5 is disposed such that it comes into contact with the flat surface portion 2*e* within the recess 2*d*, the kerf 5*d* engages the ridge portion 2*h*, and the free end of the raised-up portion 5*e* engages the through-hole 2*i*.

The elastically-contacted portion 5*g* of the spring portion 5*b* of the first elastic member 5 is disposed above the tip end portions of the pair of protruded portions 2*g*, and the elastically-contacted portion 5*g* is disposed in the direction that leaves the flat portion 5*a*, constituting the free end.

The second elastic member 4 is, as shown in FIGS. 11 and 12, made of metallic material such as, for example, stainless steel, is formed by means of press working, and has annular structure in which a plurality of (for example, three) mountain portions 4*a* and valley portions 4*b* are alternately provided. This second elastic member 4 is formed so as to have a predetermined spring pressure such as, for example, about 240 g as the spring pressure f2. This second elastic member 4 constitutes a so-called wave washer (spring washer)

This second elastic member 4 is disposed on the collar portion 2*s* of the engaging portion 2*b* of the rotor 2, is interposed between the first stepped portion 1*e* (supporting portion) of the casing 1 and the collar portion 2*s*, and the rotor 2 is pressed downward (See FIG. 1) by the second elastic member 4.

A third elastic member 6 is made of, for example, rubber material or the like, is annular, and has a base portion 6*a* having a first predetermined width and an apex portion 6*b* having a second width larger than the base portion 6*a*. Also, on the apex portion 6*b*, there is disposed an annular groove portion 6*c*.

This third elastic member 6 is disposed such that the base portion 6*a* abuts against the second stepped portion 2*r* of the rotor 2.

A cover member 7 is, as shown in FIGS. 15 to 17, made of synthetic resin material such as polyphenylene sulfide (PPS), is formed by fabrication, and has a flat plate-shaped cover portion (bottom wall) 7*a*, a side wall 7*b* extendedly provided substantially perpendicularly from the outer peripheral edge of the cover portion (bottom wall) 7*a*, and a substantially cylindrical holding portion 7*c* projecting in an inward direction of the cover portion (bottom wall) 7*a*. This cover member 7 is disposed so as to close one open end portion of the casing 1 as a cover. In this state, a clearance portion 1*g* is formed between the back surface of the proximal portion 3*a* of the resistor substrate 3 disposed within the casing 1 and the cover portion 7*a*.

A supporting portion 8 is, as shown in FIGS. 13 and 14, made of metallic material such as, for example, brass, is formed by means of cutting working, and has a circular column-shaped proximal portion 8*a*, a circular column portion 8*b* projecting from one end portion of the proximal portion 8*a* outwardly, and a conical portion 8*c* provided on the tip end side of the circular column portion 8*b*. In other words, the supporting portion 8 has the conical portion 8*c* provided on the tip end side, and the base-side circular column portion 8*b* provided continuously to the conical portion 8*c*.

The proximal portion 8*a* is pressed into the holding portion 7*c* of the cover member 7 to dispose this supporting portion 8, and pressing the proximal portion 8*a* into the holding portion 7*c* makes the supporting member 8 integral with the cover member 7.

The supporting portion 8 is disposed opposite to the shaft portion 2*c* of the rotor 2, and supports the shaft portion 2*c*. At this time, the conical portion 8*c* of the supporting portion 8 is disposed within the conical portion 2*m* of the shaft portion 2*c*, and the circular column portion 8*b* of the supporting portion 8 is disposed within the cylindrical portion 2*k* of the shaft portion 2*c*. In other words, within the recess 2*n* of the shaft portion 2*c*, there are disposed the conical portion 8*c* of the supporting portion 8 and the cylindrical portion 2*k*.

The structure is arranged such that the shaft portion 2*c* is supported by the supporting portion 8 whereby the rotor 2 is capable of rotating with the axial center of the shaft portion 2*c* as the center.

The driving shaft 10 is made of, for example, metallic material, is formed by means of cutting working, and has a circular column portion 10*a*, and a driving unit 10*b* having a D-character-shaped cross section provided at one end portion of the circular column portion 10a. On a part of the outer periphery of the driving unit 10b, there is provided a flat portion 10c.

This driving shaft 10 is engaged with the engaging portion 2b (recess 2d: hole portion) of the rotor 2 through the first elastic member 5. In this state, the elastically-contacted portion 5g of the spring portion 5b of the first elastic member 5 comes into elastic contact with the flat portion 10c of the driving shaft 10 so that the driving shaft 10 is fitted into the engaging portion 2b (recess 2d: hole portion) by means of the first elastic member 5.

The driving shaft 10 is fitted by means of the first elastic member 5, whereby the driving shaft 10 is displaced in a state in which it is restricted within the engaging portion 2b.

In this respect, in the above-described embodiment, the cover member 7 and the supporting portion 8 have been separately formed and made integral by pressing the supporting portion 8 into the cover member 7, but the present invention is not restricted there. The cover member 7 and the supporting portion 8 may be constructed such that they are integrally fabricated through the use of, for example, the same synthetic resin material as a matter of course.

Next, the description will be made of an operation of the rotary sensor according to the present invention.

First, the circular column portion 10a of the driving shaft 10 is reciprocatively rotated with the axial center of the circular column portion 10a as the center within a predetermined range of angle of rotation. By means of this reciprocative rotation of the driving shaft 10, the rotor 2 is similarly reciprocatively rotated within a predetermined range of angle of rotation.

In this respect, even if the circular column portion 10a and the rotor 2 are coupled in a somewhat off-center state at this time, the rotor 2 obliquely moves in any direction perpendicular to the axial direction of the driving shaft 10 with the conical portion 8c as the fulcrum so that both are combined.

Next, by means of the reciprocative rotation of the rotor 2, the moving contact 9 fixed to the rotor 2 slides on the resistor pattern 3b of the resistor substrate 3 and the electric conductor pattern 3c, and this sliding of the moving contact 9 causes the lead-through terminal 11 to output a predetermined resistance value made variable.

In other words, on the basis of variations in resistance value resulting from the sliding operation by the resistor pattern 3b, the electric conductor pattern 3c and the moving contact 9 constituting the angle detecting member, the operation is made so as to detect an angle of rotation of the driving unit 10 within the range of angle of rotation.

As described above, in the rotary sensor according to the present invention, within the recess of the shaft portion of the rotor, the conical portion of the supporting portion of the casing is disposed, and is supported by the conical portion, the shaft portion of which is fitted in the recess, whereby the conical portion of the casing is disposed within the recess of the rotor, which is rotating, and therefore, even if shavings may be generated, they are generated within the recess, which is rotating, and only comparatively small shavings are generated without accumulating temporarily. Even if these comparatively small shavings adhere onto the resistor pattern 3b of the resistor substrate 3 and the electric conductor pattern 3c, the electric characteristics and service life of the rotary sensor will be hardly affected, and a rotary sensor having a stable long service life can be provided.

Also, in the rotary sensor according to the present invention, the angle detecting member has the resistor pattern or the electric conductor pattern, which constitutes a part thereof, the resistor pattern or the electric conductor pattern is provided on one surface of the flat plate-shaped proximal portion having a through-hole, and the tip end portion of the shaft portion is fitted in the through-hole beyond one surface of the proximal portion, whereby shavings generated within the recess of the shaft portion are not discharged over one surface on which the resistor pattern or the electric conductor pattern has been provided, and therefore, a rotary sensor having a stable long service life can be provided.

Also, in the rotary sensor according to the present invention, the cover member has a cover portion with the supporting portion provided, and between the cover portion and the proximal portion, there is provided a clearance portion, whereby shavings, which have been generated within the recess of the shaft portion, are to be discharged into the clearance portion, and since they do not scatter in any other places than the clearance portion, the shavings do not adversely affect the angle detecting member, but a rotary sensor having a stable long service life can be provided.

Also, in the rotary sensor according to the present invention, the supporting portion is made of metallic material separated from the cover member, and is held by the cover member, whereby the supporting portion formed of metallic material is less worn out and shavings are less generated accordingly, and a rotary sensor having a stable, long service life can be provided.

Also, in the rotary sensor according to the present invention, the circular column portion of the protruded portion is fitted in the cylindrical portion of the shaft portion and the rotor is constructed such that the cylindrical portion is pivotally supported by means of the outer peripheral surface of the circular column portion, whereby the rotation of the rotor does not shake with respect to the axis, but the rotation of the rotor is stabilized.

What is claimed is:

1. A rotary sensor, comprising: a rotor having an engaging portion, with which a driving shaft engages; a casing for rotatably supporting the rotor; and an angle detecting member housed within the casing, for being operated by the rotation of the rotor, wherein the rotor has the engaging portion located forward; and a shaft portion located at the rear on the opposite side, provided at a rotor-central portion of the rotor, the casing has a supporting portion provided at a position opposite to the shaft portion of the rotor, there is formed a recess at the shaft portion of the rotor, there is formed a convex-shaped conical portion in the supporting portion of the casing, and there is disposed the conical portion within the recess, and the shaft portion is supported by the conical portion fitted in the recess, the casing is formed with a hole portion through which the rotor is inserted; and the hole portion and the rotor are formed with a predetermined clearance in a direction perpendicular to a center line of the rotating shaft of the rotor; and an end of the shaft portion is provided with a cylindrical portion, the recess has a conical recess positioned at the cylindrical portion, and a top of the conical recess contacts a top of the conical portion of the supporting portion and is pivotally supported.

2. The rotary sensor according to claim 1, wherein the angle detecting member has a resistor pattern or an electric conductor pattern constituting a part thereof, the resistor pattern or the electric conductor pattern is provided on one surface on a flat plate-shaped proximal portion having a through-hole, and a tip end portion of the shaft portion is inserted through the through-hole beyond the one surface of the proximal portion.

3. The rotary sensor according to claim 2, wherein the casing has a bottom wall provided with the supporting portion, and between the bottom wall and the proximal portion, there is provided a clearance portion.

4. The rotary sensor according to claim 1, wherein the supporting portion is formed of metallic material separated from the casing, and the supporting portion is held by the casing.

5. A rotary sensor, comprising: a rotor having an engaging portion, with which a driving shaft engages; a casing for rotatably supporting the rotor; and an angle detecting member housed within the casing, for being operated by the rotation of the rotor, wherein the rotor has the engaging portion located forward; and a shaft portion located at the rear on the opposite side, provided at a rotor-central portion of the rotor, the casing has a supporting portion provided at a position opposite to the shaft portion of the rotor, there is formed a recess at the shaft portion of the rotor, there is formed a convex-shaped conical portion in the supporting portion of the casing, and there is disposed the conical portion within the recess, and the shaft portion is supported by the conical portion fitted in the recess, and at a tip end of the shaft portion, there is provided a cylindrical portion, the recess is constituted by a circular hole located at the cylindrical portion and a conical recess formed within the circular hole, the supporting portion has the conical portion provided on the tip end side and a circular column portion on a base side, contiguously provided to the conical portion and the circular column portion is fitted into the cylindrical portion in such a manner that the cylindrical portion is guided by an outer peripheral surface of the circular column portion and the rotor is pivotally supported by the supporting portion.

* * * * *